Oct. 18, 1955   C. J. MORSEY   2,720,843
HYDRAULIC DRIVE

Filed Feb. 4, 1952   3 Sheets-Sheet 2

INVENTOR.
CHARLES J. MORSEY.
BY Howard J. Whelan.
ATTORNEY.

Oct. 18, 1955 — C. J. MORSEY — 2,720,843
HYDRAULIC DRIVE
Filed Feb. 4, 1952 — 3 Sheets-Sheet 3

INVENTOR.
CHARLES J. MORSEY.
BY Howard J. Whelan.
ATTORNEY.

United States Patent Office 2,720,843
Patented Oct. 18, 1955

2,720,843

HYDRAULIC DRIVE

Charles J. Morsey, Baltimore, Md., assignor of one-half to Fred Middlestadt, Baltimore, Md.

Application February 4, 1952, Serial No. 269,858

2 Claims. (Cl. 103—161)

This invention relates to power transmission and speed changing devices and more particularly to those applicable to driving motor vehicles through the use of a hydraulic medium.

There are a number of mechanisms designed and utilized for the propulsion of machines, automobiles and other vehicles, most of which employ moving parts, or the surface tension of the transmission medium and its attraction for the surfaces of the materials, which make up the components of the devices involved. The efficiency of the devices vary, their control is generally uncertain, and slippage is frequently a major problem with them. This invention avoids the use of propeller components and instead employs reciprocating elements that produce positive pressure in the medium to conduct the latter where it will be received without appreciable losses and converted into driven power. To do this, the driving shaft of the motive power is brought into a housing containing a rotary casing in which reciprocating pump-like mechanisms are actuated by cams or eccentric crank shafts. The pump-like mechanisms exert pressure on a hydraulic medium and force same through ports to a similar housing where the pump-like mechanisms are forced by the medium to work oppositely to those in the first mentioned housing, and in turn operate against the cams or cranks that are fixed against rotation, causing the housing to rotate the driven shaft attached to it.

One of the objects of this invention is to provide a new and improved hydraulic power transmission device, that will avoid one or more of the disadvantages and limitations of the prior art.

Another object of this invention is to provide a new and improved hydraulic power transmission and speed reducing device that will use the direct pressure of the hydraulic medium produced by the driving shaft of one component to propel the driven shaft in a second component.

A further object of the invention is to provide a new and improved hydraulic power transmission device or fluid coupling that will be effective in operation, simple in construction and economical to operate in service.

Still another object of the invention is to provide a new and improved hydraulic power transmission device that can use the principles involved in the operation of reciprocating pump-like mechanisms for the transmission of power from a primary component to a secondary component.

An additional object of the invention is to provide a new and improved hydraulic power transmission device that can be controlled to vary the amount of power transmitted through it, by a simple arcuate alignment or misalignment of its internal parts in relation to each other.

Still another object of this invention is to provide a new and improved hydraulic power transmission device with its operative components comprising a driving shaft positioned in a housing and with said components coupled to linkages and operating against changeable positioned cams or eccentric crank shafts to drive a series of pistons in predetermined sequence and force a hydraulic medium through ports in the housing to another housing where it operates another similar series of pistons against fixed cams or eccentric crank shafts to rotate the driven shaft.

Other objects of the invention will become apparent as the invention is more fully disclosed.

For a clearer understanding of the invention and the objects thereof, reference is made to the accompanying drawings, wherein a particular form of the invention is indicated. These drawings when used in conjunction with the following description serve to illustrate the invention, its principles and operation, while the claims indicate the scope thereof.

In the drawings:

Figure 4 is a diagrammatic detail indicating the arrangement of gears used to adjust the pistons in the driving unit to control the travel of the pistons in the driven unit;

Similar reference numerals indicate the same parts throughout the drawings.

Figure 1:
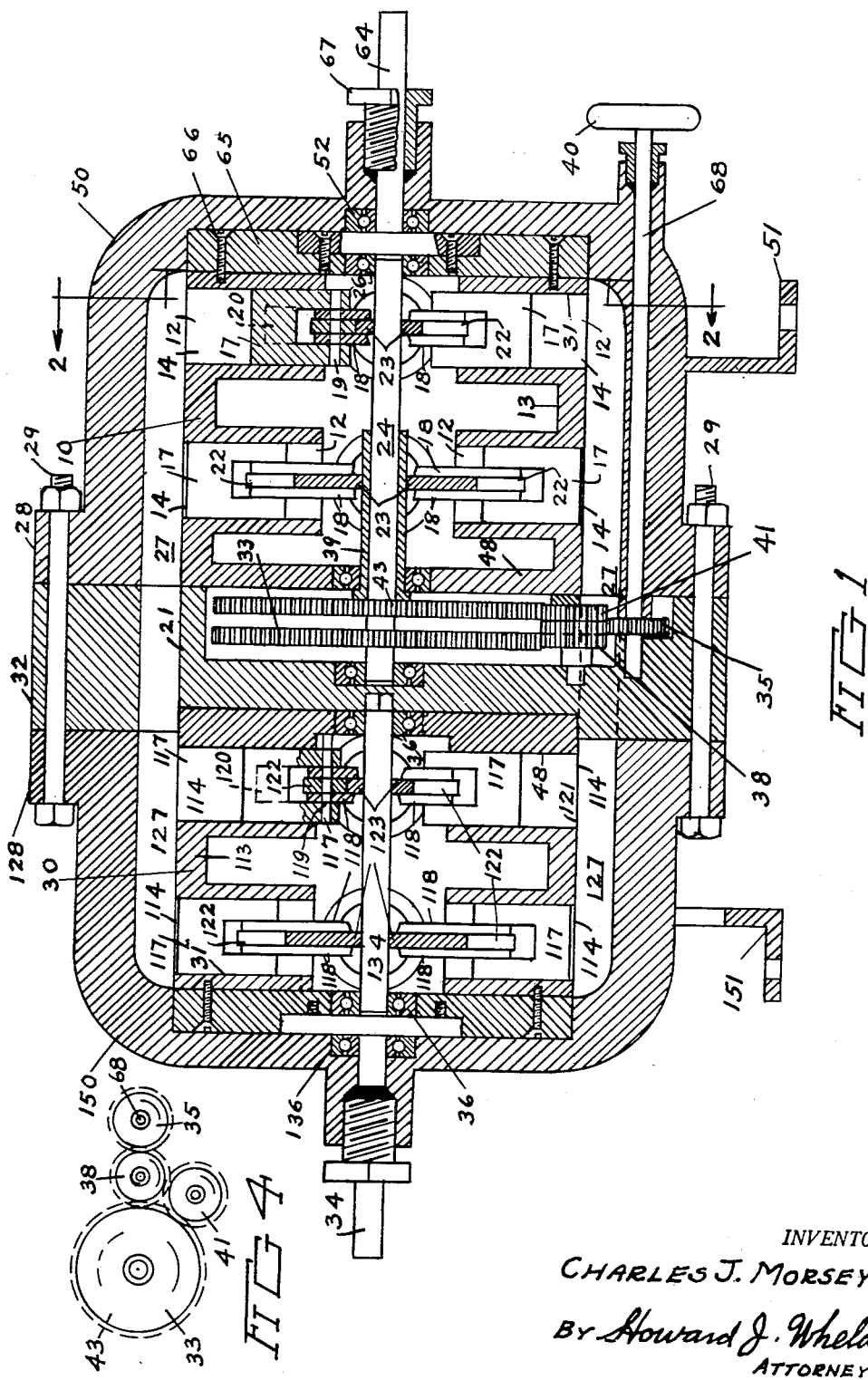
Figure 1 is a longitudinal sectional elevation of a transmission embodying this invention, showing the driving and driven units having parts broken away to indicate their interior construction.
Figure 2:
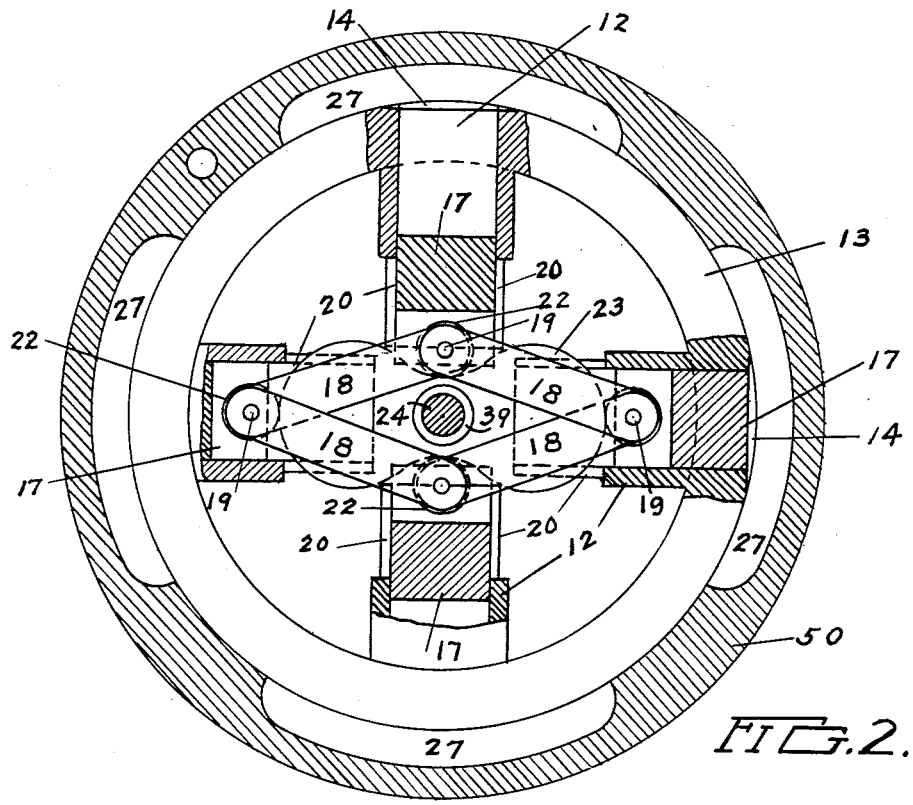
Figure 2 is a sectional elevation taken on line 2—2 of Figure 1, showing the internal portions of the driving unit, with parts broken away to indicate the interior construction.
Figure 3:
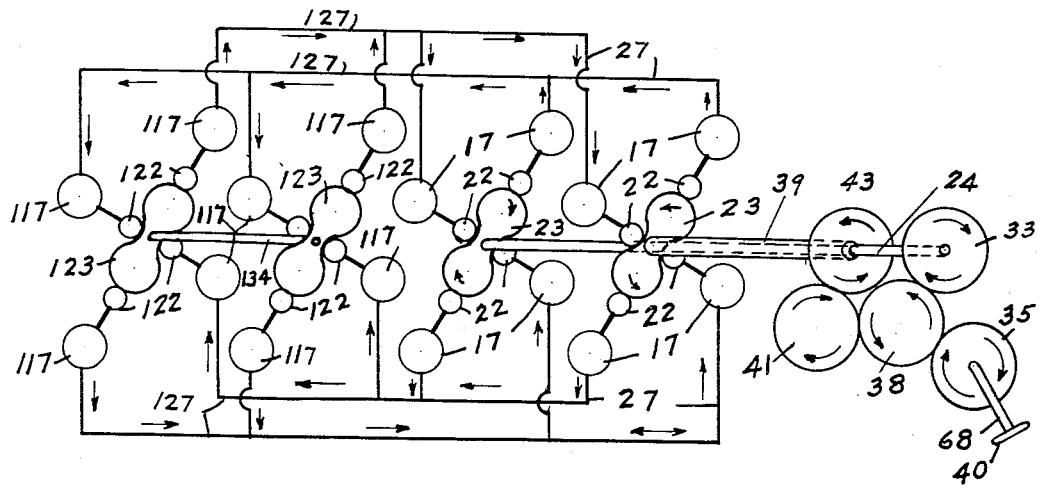
Figure 3 is a diagrammatic outline showing the cams, ducts, and connecting mechanism employed to reciprocate the pistons used in this embodiment.

In the construction shown, a hydraulic transmission device consists of a double housing formed of symmetrical sections 10 and 30 respectively which operate in a casing formed of units 50 and 150. The section 10 contains the components that are termed the driving elements, while those in the section 30 are the driven units. The operating components are not mechanically coupled together but are connected through the use of suitable hydraulic medium conducted through passages preferably in the housing from one section to the other. For use where the device is rigidly mounted, suitable brackets 51 and 151 are incorporated on the exteriors of the casing so it may be bolted in place to whatever supporting structure is involved.

The driving section 10 includes two sets of four pump-like components termed pistons or pumps, and consisting of cylinders 12 radially formed in the circumferential peripheral wall 13 of the shell of the housing 10, one set of four cylinders is aligned with the first set. They may be removably attached within the wall 13 and preferably held in place in any conventional manner. The cylinders are open at both ends and of equal length and short enough to leave an open space about the central area of the device. Guide slots 20 extending from the central area longitudinally are placed in the wall of each cylinder to allow clearance for links 18 to move through during the travel of each piston 17 reciprocable therein. The links 18 are formed like a toggle mechanism, connected to the pistons 17 through piston pins 19, located transversely across the piston. The links slide in the slots 20 when they are reciprocated. The links are used in pairs for each cylinder and parallel to each other and of the same length, and between them they carry rollers 22 on their pins 19 for each piston. These rollers 22 have their peripheral surfaces in operational contact with those of an 8-like cam 23 that is mounted on and moves with the cam adjusting shaft 24 when moved by gearing to be described later. The driving shaft 64 is coupled to the driving section 10 by a plate 65 and screws 66 and it is driven by a motor or engine not shown. The cam adjusting shaft 24 extends through the housing 10 and is supported by the bearing 26 provided in the walls of the housing 10. A bearing 52 fitted into the casing 50 supports the shaft 64, and a stuffing nut 67 makes the fitting leakproof. The wall of the casings preferably has four open passages 27 and 127 extending along its inner circumferential surface preferably parallel to the axis of the shafts 24 and 34. Each set of passages, four in number, corresponds with the openings 14 and 114 in the cylinders 12 and 112, so the pistons 17 and 117 can pump the hydraulic medium used directly into the passages, when registered therewith. The wall or shell 13 is rotated by the shaft 64 in its general operation. In addition the cam 23 is rotated with the shaft 24 to vary the positions of the pistons in the cylinders and thereby control the flow of the hydraulic medium. The details of this operation will be explained later. However, in the driving section it can be appreciated that the wall 13 of the inner shell or casing and the components connected therewith, are rotatably moved over the internal circumferential surfaces 21 inwardly projected from the wall of the casing 50. This contact is made tight enough to assist in keeping the medium from leaking through.

Briefly the operation of section 10 is brought about by the rotation of the driving shaft 64 that in turn rotates the driving section 10 around the 8-like cam 23 mounted on shaft 24. This cam presses against the rollers 22 and induces the pistons 17 to reciprocate in the cylinders and carry the linkage 18 with them. The pistons force the hydraulic medium through the openings or ports into the passages 27 registered with them individually and from them the medium passes to the driven section 30 to operate its components inversely. Two pistons according to this arrangement in each set, force the hydraulic medium out into the passages 27, while the other two will be drawing it in from their respective passages.

The driven section 30 with its components, is similar in general construction to that of the driving section 10, except that both the cams, and shaft 134 are fixed against rotation. It has two sets of cylinders totaling eight in all, secured to its peripheral wall 113 by any conventional manner. Its pistons 117 are actuated by the pressure of the medium received from the driving unit and transmit the power to rollers 122 which contact the 8-contoured cam 123 to rotate the shell 30 and the driven shaft 34 attached thereto. The rollers 122 are connected by links 118 and pistons 117 by piston pins 119. The slots 120 in the walls of the cylinders provide clearance for the links 118 as the rollers 122 are operated in contact with the peripheral surface of their respective cams. These components are driven through the use of the hydraulic medium forced from section 10 in predetermined sequence to section 30. It passes through the passages 127 in the housing 30 from the passages 27 in the housing 10 and thence through the ports or openings 114 leading to the pistons and reciprocates them in the opposite sequence to those that force the medium to them. The bearing 36 supports the shaft 134 in the housing 30 and center wall 32, and bearing 136 in the casing 150 supports shaft 34. The circumferential surface of the wall 113 slides around against the surface 121 of the housing 30 as in section 10 and assists in keeping it tight against leakage of the hydraulic medium.

Both sections 10 and 30 are held tightly together by bolts 29 passing lengthways through the lugs 28 and 128 and center wall 32. The center wall 32 is positioned between the sections 10 and 30 in which the pistons and mechanisms operate to separate the working parts in one section from the other, so the hydraulic medium cannot get through, except through the passages 27 and 127 and also to give access to each section. End walls 31 and 48 are provided in each section. A space is provided in the center wall 32 in which the cam adjusting gears 33, 35, 38, 41 and 43 operate. The gear 33 is mounted on shaft 24 and rotates the cam mechanism in shell 10, when the lever or handle 40 is moved through the arcuate path provided for it. The purpose of this cam movement is to displace the positions of the pistons in the cylinders 12 in the shell 10 in their alignment in relation to its mating row of pistons to reduce or increase the flow of the medium to the section 30. In this manner the speed and power in the section 30 is decreased or increased as required.

The gears 33, 35, 38, 41 and 43 operate as follows: The gear 35 is rotated through a predetermined number of degrees by a shaft 68 and handle 40 and moves an idler gear 33 which rotates large gear 33 keyed to the shaft 24 and rotates its cams 23 clockwise. At the same time the gear 38 operates a gear 41 which moves the inner large gear 43 on the sleeve 39 and its cams 23 counterclockwise. One cam mechanism of the driving section 10 connected with sleeve 39 is displaced and displaces its own set of pistons a proportional amount. The other cam mechanism mounted on shaft 24 is displaced an equal amount in the opposite direction. The sections could be shown operating under a remote control system, where the two sections are located distantly from each other. In this instance the hydraulic medium is carried from one section to the other, by means of pipes or conductors, which serve to produce the same effect as when the sections are directly joined to one another in a single unit.

The device in the invention is relatively simple. The use of pistons affords a positive method of forcing the medium under pressure regardless of the speed of the components. There is no slippage, such as can happen where rotary pump or the fluid coupling elements are employed. The parts are readily accessible, and lubrication is easily provided for. This can be accomplished as an example by filling the passages with oil of suitable consistency so the moving parts will lubricate themselves as they move in it. The cooling of the device is accomplished by the movement of the hydraulic medium as it absorbs heat from the inner surfaces to dissipate it to the exterior surfaces. The operation of the parts in section 30 is the reverse of that outlined for section 10, as one pair of pistons in section 10 are pushing the hydraulic medium out of a corresponding pair of pistons in section 30 is being pushed back a corresponding amount and as the other pair of pistons in section 30 move outwardly it forces the expanded hydraulic medium back to its corresponding cylinders in section 10 so the cycle will start over again. The operation of the intermediate pistons increase the effect and also spread the power pulsation through a longer period in each cycle, thereby making the rotation of the driven shaft more uniform. The device can be employed for high or low speeds, and reverse, without change, requiring only the adjustment of the cam and pistons in proper or suitable alignment in the cylinders and passages, as already noted. In the section 30 the pistons actuate the shaft 34. The cams 123 do not have the adjustment to position the pistons 117 like the adjustment in section 10 as mentioned.

From the above description it will be seen that the system comprises the positive displacement of a double row of rotary piston pumps employed in the drive unit. The cylinders are positioned radially in two rows of four each, enclosed in a revolving housing 10 attached to the drive shaft.

The pistons are linked together in each row about a two-lobed 8-like cam which is statically mounted in the center to the housing. The cam in each row of cylinders is arranged so that they can be rotated in a limited arc in relation to its mating cam to produce a compensating action, to reduce the amount of flow of the fluid, or an expanding action to produce a greater flow.

The regulation of the cams is accomplished through a train of spur gears operated manually by a lever described above. The casing 50 and 150 is divided into four channels extending across the top of the pistons, parallel with the axis of rotation and comprises the valve system and the pressure and return lines for the system.

The driven unit is an exact duplicate of the drive unit without the control mechanism and can be located and mounted at a remote location or incorporated in the same housing with the driven unit.

In addition to the operation described above the cams are set in neutral position with the high point of one cam coinciding with the low point of its mating cam so that the fluid displacement by the rising piston is taken up by the opposite receding piston. As the cams are moved from the neutral position the volume of fluid displacement by one cylinder or piston is not quite compensated for by its mating piston so that a flow of liquid through the pressure chamber acts on the pistons in the driven unit to produce rotation of the driven shaft. A further movement of the controls produces a greater flow of the fluid until both mating pistons are displacing fluid at the same time. This produces maximum flow and corresponds to high speed. Reverse rotation is accomplished by moving the cams in the opposite direction from the forward speed. This reverses the flow of fluid and the pressure side becomes the return side and vice versa.

Figure 5:
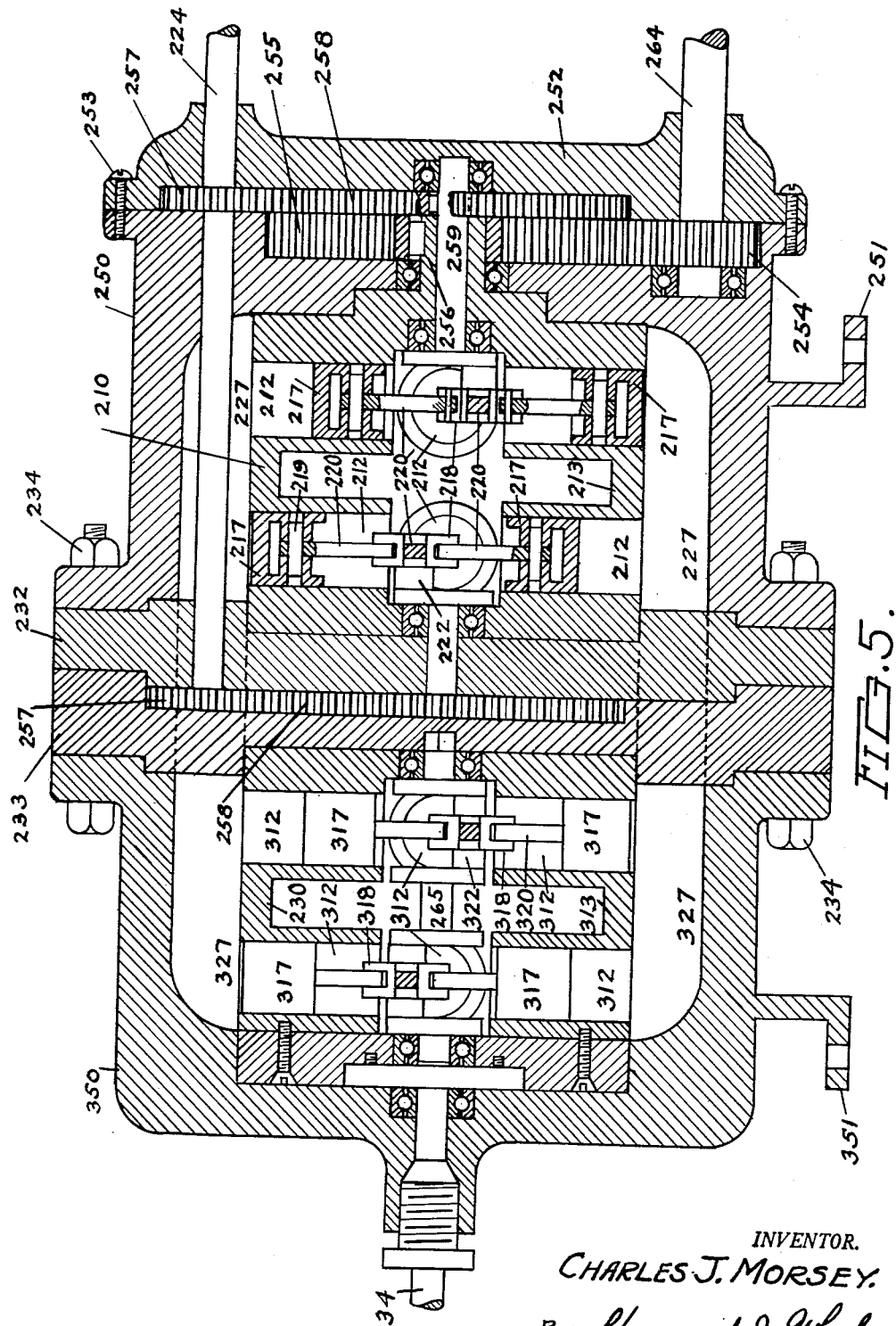
Figure 5 is a longitudinal sectional elevation of a modified form of a transmission embodying this invention, showing the driving and driven units, with parts broken away to show the substitution of cranks to replace the cams shown in Figure 1, the operation is the same.

In the modification shown in Figure 5, a hydraulic transmission device consists of a double housing formed of sections 210 and 230 respectively operating in a casing formed of units 250 and 350. The section 210 contains the componets that are termed the driving elements, while those in the section 230 are termed the driven elements. The operating components are not mechanically coupled together but are connected through the use of a suitable hydraulic medium conducted through passages 227 and 327 preferably in the housing from one section to the other as described above. Brackets 251 and 351 are incorporated on the exteriors of the casing so it may be attached to some supporting structure when desired.

The driving section 210 includes two sets of four pump-like components termed pistons or pumps, and consisting of cylinders 212 formed in the wall 213 of the shell of the housing 210, the first set of four cylinders are spaced 90° apart and the second set of four cylinders are aligned with the first set. The cylinders may be attached within the peripheral wall 213 or made a part thereof if desired. The cylinders are opened at both ends and are of a length and spacing similar to that described for those shown in Figure 1 of the drawing. Pistons 217 reciprocate in the cylinders 212 and are provided with connecting pins 219 for pivotally attaching connecting rods 220 thereto. The other ends of the connecting rods are pivotally connected to a crank collar 218 positioned on the crank pin 222 and move the pistons as the crank pin 222 is turned.

The driving shaft 264 is rotatably supported by a cap 252 affixed to the casing 250 by screws 253. A spur gear 254 is affixed to the driving shaft 264 and meshes with another spur gear 255 keyed to a projecting sleeve 256 and forms the driving means for the driving section 210 when driven by a motor or engine not shown. The crank adjusting shaft 224 extends through the cap 252, housing 250 and separating plate 232 and is provided at one end with a fixed crank driving gear 257 that meshes with a crank driven gear 258 affixed to a crank shaft 259. The opposite end of the crank adjusting shaft 224 is provided with a crank driving gear 257 and meshes with a crank driven gear 258 affixed to a second crank shaft 259. These cranks are used to vary the positions of the pistons in the cylinders to control the flow of the hydraulic medium in a similar manner to using the cams explained above. The operation of section 210 is caused by the driving shaft 264 rotating a gear 254 meshed with a gear 255 attached to the projecting sleeve 256 of the driving section 210. This causes the section 210 to rotate around the cranks and reciprocate the pistons in the cylinders and forces the hydraulic medium through the openings or ports into the passages 227 registered with them individually and from them the medium passes to the driven section 230 to operate its components inversely. Two pistons according to this arrangement in each set, force the hydraulic medium out into the passages 227, while the other two will be drawing it in from their respective passages.

The driven section 230 with its components, is similar in general construction to that of the driving section 210, except its crank shaft 265 is fixed in supporting plate 233 against rotation. The crank shaft 265 is provided with crank pins 322 set 180 degrees apart and are provided with crank collars 318, connecting rods 320 actuated by pistons 317. It also has two sets of cylinders 312 totaling eight in all secured to the peripheral wall 313 by any conventional manner. The first set of four cylinders 312 are formed in the wall 313 and spaced 90° apart and the second set of four cylinders 312 are aligned with the first set in the same manner as described for wall 213. Its pistons 317 are actuated by the pressure of the medium received from the driving unit and transmits the power to the driven shaft 334 in the same manner as that described for the unit shown in Figure 1. Bearing and stuffing boxes are provided where needed. The casings 250 and 350 are clamped to the separating plate 232 and supporting plate by bolts 234.

While two general forms of the invention are shown in the drawings and described in the specifications, it is not desired to limit this application for patent to these particular forms as it is appreciated that other forms of construction could be made that would use the same principles and come within the scope of the appended claims.

Having thus described the invention, what is claimed is:

1. A hydraulic pump comprising a stationary casing, a rotary shell within said casing, a shaft for rotating said shell, said shell consisting of a plurality of parallel sets of aligned cylinders, each set being radially arranged, and said cylinders being open at both ends, pistons in each of the cylinders, interconnecting links between the pistons of each set, said links being coupled in pairs for each cylinder, a roller connecting each cooperating pair, a cam cooperating with said rollers, said cam having a periphery in the shape of figure 8, and ports and passages between the casing and the cylinders to allow flow of a hydraulic medium therethrough.

2. A hydraulic pump as set forth in claim 1, including means for varying the position of the cam to vary the displacement of the fluid.

References Cited in the file of this patent

UNITED STATES PATENTS

| | | |
|---|---|---|
| 1,044,846 | Barbarou | Nov. 19, 1912 |
| 1,122,972 | Maye | Dec. 29, 1914 |
| 1,250,860 | Guy | Dec. 18, 1917 |
| 1,502,310 | Magie et al. | July 22, 1924 |
| 1,719,693 | Ernst | July 2, 1929 |
| 1,974,961 | Johnson | Sept. 25, 1934 |

FOREIGN PATENTS

| | | |
|---|---|---|
| 168,488 | Great Britain | Sept. 8, 1921 |
| 587,542 | France | Apr. 20, 1925 |